United States Patent [19]
Kabis

[11] Patent Number: 5,171,334
[45] Date of Patent: Dec. 15, 1992

[54] DIFFUSED AIR STRIPPING SYSTEM

[76] Inventor: Thomas W. Kabis, 7990 NW. 37th St., Ankeny, Iowa 50021

[21] Appl. No.: 726,898

[22] Filed: Jul. 8, 1991

[51] Int. Cl.⁵ .............................................. B01D 19/00
[52] U.S. Cl. ...................................... 55/196; 210/170
[58] Field of Search ................. 55/196, 53, 198; 210/170

[56] References Cited

U.S. PATENT DOCUMENTS 4,892,664  1/1990  Miller ................................. 55/196

FOREIGN PATENT DOCUMENTS 244341  5/1969  U.S.S.R. ............................. 55/196

*Primary Examiner*—Bernard Nozick
*Attorney, Agent, or Firm*—Henderson & Sturm

[57] ABSTRACT

A diffused air volatile organic compound stripping system including a complete pumping system, a sequential stripping system, a free-petroleum-product separation system, and a free-product collection system with automatic controls, all packaged into a trailerized, easy to install and operate system. The stripping portion of the system is composed of three vertical stripping tanks, step-phase plumbed together to allow gravity feed from the first tank to the last. Each of the stripping tanks includes an internal concentrator tube into which is inserted an air diffuser designed to produce thousands of tiny air bubbles. The ground water (and free-product if any) is recovered from an on-site ground-water recovery well and pumped into a baffled separator tank. The upper free product fraction flows to a free product receptor fitted with an overflow shut-off switch. The lower ground water fraction then passes out of the separator tank into the first stripping tank where it is stripped of approximately 75% of the available VOC's, passes to the next stripping tank where the process is again repeated, and finally the third stripping tank where the process is repeated again before final discharge to the waiting sewer. The pumping system provides a variable flow rate through the system, adjustable according to the VOC concentration of the influent ground water and the flow characteristics of the well.

6 Claims, 3 Drawing Sheets

DIFFUSED AIR STRIPPING SYSTEM

TECHNICAL FIELD

This invention relates to separation process equipment, and more particularly to a diffused-air-type volatile organic compound stripping system for use in ground-water reclamation and remediation.

BACKGROUND ART

Groundwater contamination by volatile organic compounds, such as gasoline, presents a serious environmental problem. Ground-water reclamation and remediation are now required by most state and/or local governments. Two major production-types of air-diffusion strippers (air-strippers) are commonly used to separate volatile organic compounds from groundwater; the stripping tower, and the sequential tray-type stripper. Both of these systems use massive volumes of air and are designed for high-flow situations where a large volume of water with relatively high concentrations of volatile organic compounds (VOC's) are present in the water.

The stripping tower is composed of a tall tower, usually 20 feet high, filled with a particular packing material designed to atomize or disperse the influent contaminated groundwater. The stripping tower inputs the contaminated ground water into the top of the tower and allows it to cascade through the packing, while a high-pressure, high-volume blower blows air past the cascading water. This causes a partial-pressure differential between the VOC-contaminated water and the "clean air" blowing past it, thereby allowing the VOC's to pass from the ground water into the by-rushing air. The resulting vapor laden with VOC's passes out through the top of the tower into the atmosphere. The water collects in the bottom of the tower and exits, by pump, through the base of the tower to a sewer drain.

The trough-type or "tray-type" sequential stripper uses similar technology as the stripping tower, however the tower is replaced by several "baffled", stacked, horizontal trays. The influent contaminated ground water enters through the top of the stack of trays, and is dispersed by the baffles. High-pressure, high-volume air is, as previously described, blown past the dispersed water, volatilizing the VOC's into a vapor which is then vented to the atmosphere. The "stripped" ground water collects in the bottom tray and exits, by pump out to a sewer drain.

Both of these systems are necessarily mounted in on-site constructed buildings for which building permits, zoning hearings, and building commission hearings are required. The addition of the equipment usually increases the owner's tax base and the installation requires a disproportionate amount of engineering and construction time.

Those concerned with these and other problems recognize the need for an improved diffused air stripping system.

DISCLOSURE OF THE INVENTION

The present invention provides a diffused air volatile organic compound stripping system including a complete pumping system, a sequential stripping system, a free-petroleum-product separation system, and a free-product collection system with automatic controls, all packaged into a trailerized, easy to install and operate system. The stripping portion of the system is composed of three vertical stripping tanks, step-phase plumbed together to allow gravity feed from the first tank to the last. Each of the stripping tanks includes an internal concentrator tube into which is inserted an air diffuser designed to produce thousands of tiny air bubbles. The ground water (and free-product if any) is recovered from an on-site ground-water recovery well and pumped into a baffled separator tank. The upper free product fraction flows to a free product receptor fitted with an overflow shut-off switch. The lower ground water fraction then passes out of the separator tank into the first stripping tank where it is stripped of approximately 75% of the available VOC's, passes to the next stripping tank where the process is again repeated, and finally the third stripping tank where the process is repeated again before final discharge to the waiting sewer. The pumping system provides a variable flow rate through the system, adjustable according to the VOC concentration of the influent ground water and the flow characteristics of the well.

An object of the present invention is the provision of an improved diffused air stripping system.

Another object is to provide a stripping system that has an uncomplicated design including a minimum number of moving parts and is, therefore, easy to install, operate and maintain.

A further object of the invention is the provision of a stripping system that is an effective alternative to oversized and over-priced stripping towers and horizontal cascade-type systems.

Still another object is to provide a stripping system that has lower operating costs.

A still further object of the present invention is the provision of a stripping system that is portable and therefore requires no zoning or planning hearings, does not result in increased property taxes, and can be conveniently removed and reused at another site.

BRIEF DESCRIPTION OF THE DRAWINGS

There and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
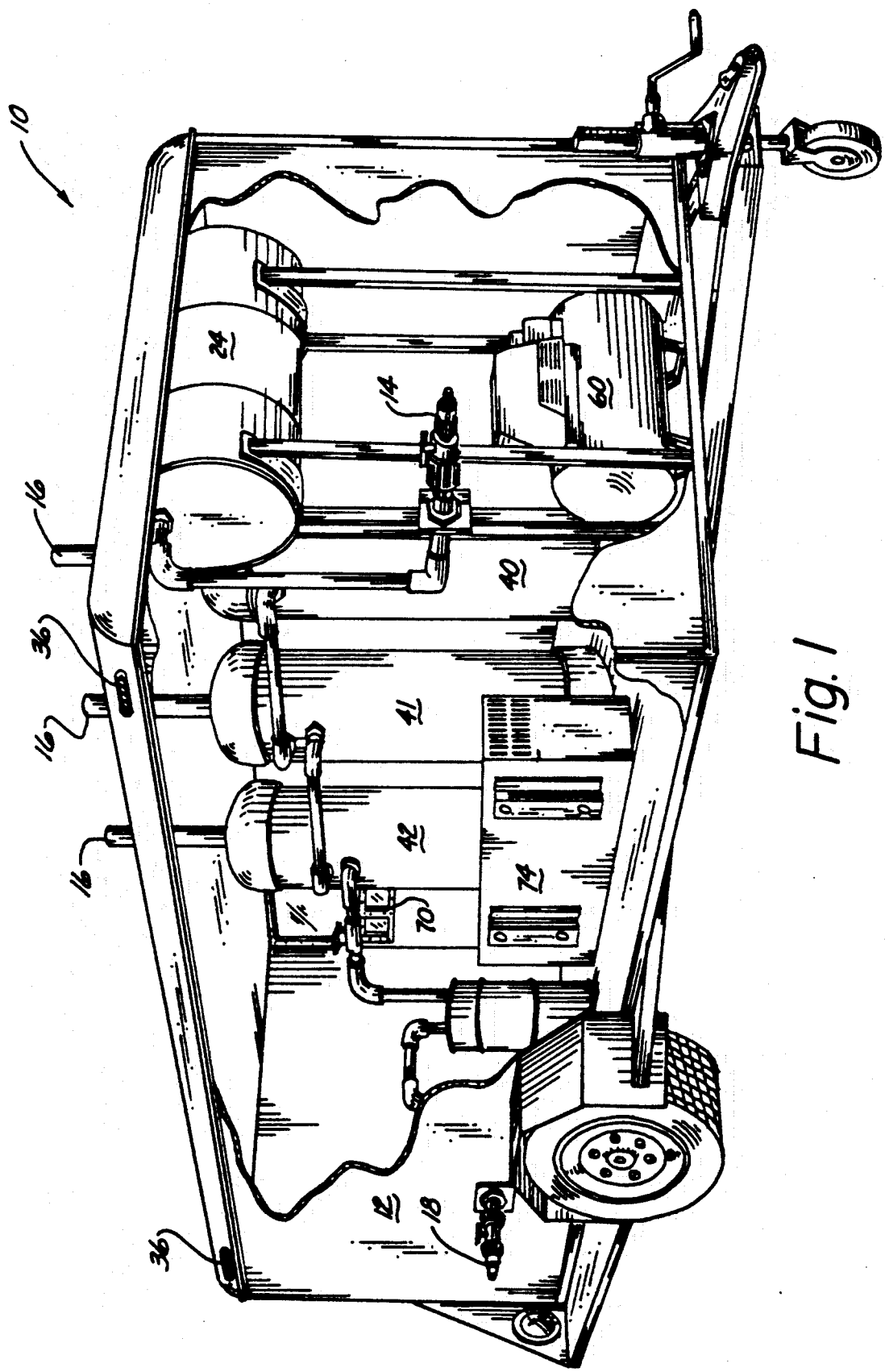
FIG. 1 is a perspective view of the portable stripping system of the present invention with portions of the trailer cutaway to show the location of the process equipment.

Referring now to the drawings, wherein like reference numerals designate identical or corresponding parts throughout the several views, FIG. 1 shows the volatile organic compound stripping system (10) of the present invention. The system (10) includes a portable trailer (12) that functions to house all of the processing equipment required to effectively separate volatile organic compounds from incoming groundwater. The contaminated groundwater enters the trailer (12) through a port, the organic vapors exit from stacks (16), and the purified groundwater exits through ports (18).

Figure 2:
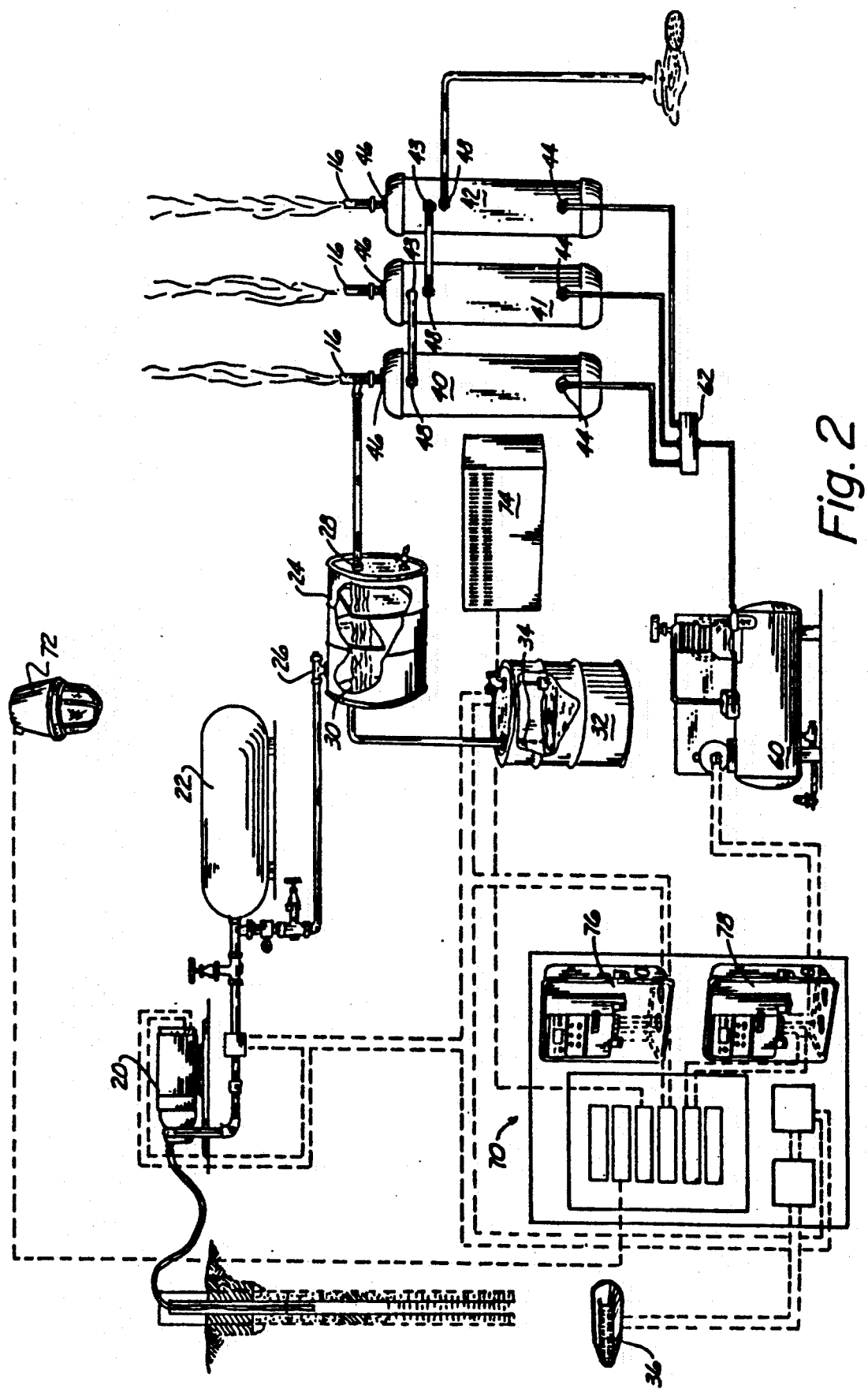
FIG. 2 is a schematic diagram of the stripping system.
Figure 3:
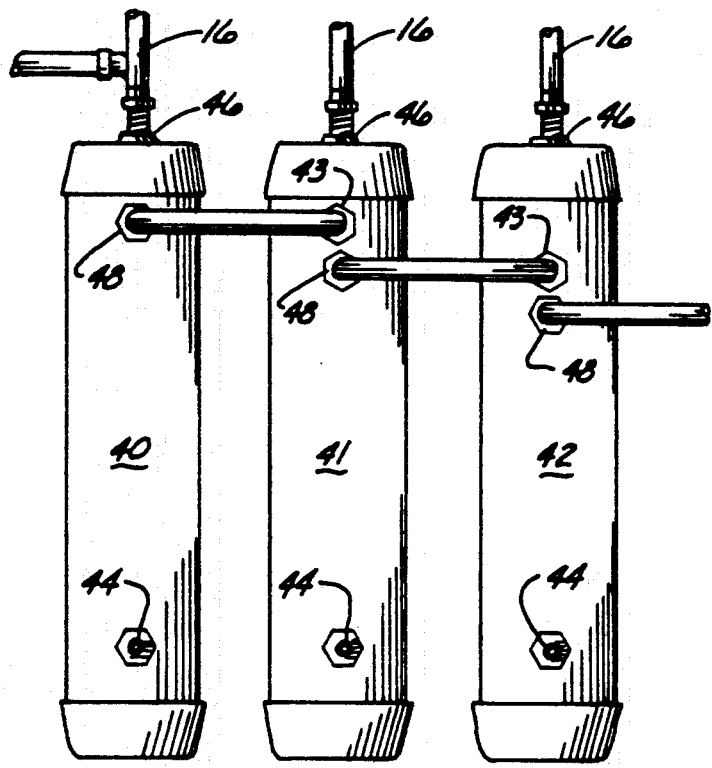
FIG. 3 is a side elevational view of three stripping tanks step-phase plumbed together to allow gravity feed of ground water from the first tank to the last.
Figure 4:
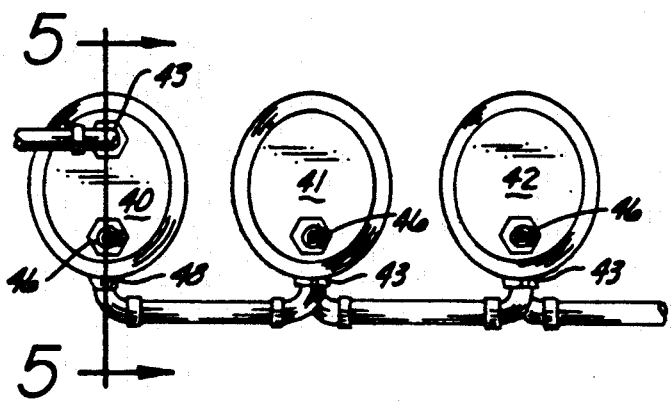
FIG. 4 is a top plan view of the stripping tanks.

The schematic of FIG. 2 best shows the processing equipment used to treat the contaminated groundwater. The groundwater is pumped from a well by a constant speed pump (20). The pump (20) feeds into a pressure tank (22) which in turn supplies a separator tank (24). The separator tank (24) includes an inlet (26), a water outlet (28), and a free product outlet (30) positioned at an elevation above the water outlet (28). Contaminated groundwater in the separator tank (24) separates into a lighter free product fraction which flows out outlet (30) into the free product drum (32), and a heavier groundwater fraction that flows out outlet (28) into the stripping tanks (40).

The free product drum (32) includes an overflow shut-off switch (34). When the free product level in the drum nears maximum capacity, the switch (34) deactivates the pump (20) and activates flashing warning lights (36) mounted to be visible from the exterior of the trailer (12). The full free product drum (32) is removed, an empty replacement drum (32) is connected, and the pump (20) is activated to resume operation.

Groundwater exiting the separator drum (24) enters the first stripping tank (40) through the water inlet (43). Stripping air, supplied by a compressor (60) through a manifold (62), enters the stripping tank (40) through the air inlet (44). Organic vapors exit the stripping tank (40) through a vapor outlet (46), and stripped groundwater exits the tank (40) through a stripped water outlet (48). The second and third stripping tanks (41 and 42) are similar to the first stripping tank (40), but differ in that the water inlets (43) are successively positioned at a lower elevation to allow gravity flow through the system.

Figure 5:
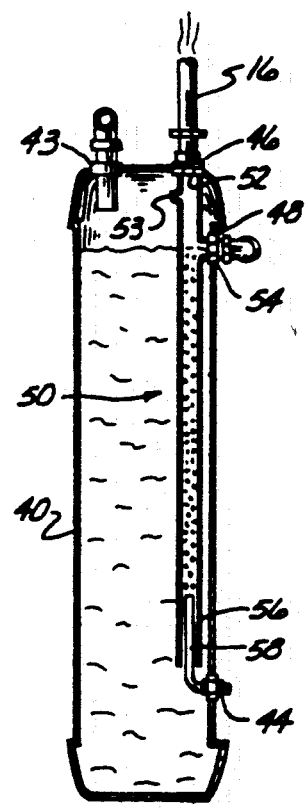
FIG. 5 is a sectional view taken along line 5—5 of FIG. 4, showing the internal concentrator tube with the air diffuser positioned in the lower end.

Referring now to FIG. 5, each of the stripper tanks (40, 41, 42) carries an internal concentrator tube (50) having an upper end (52) directly connected to the vapor outlet (46), a vent opening (53), an intermediate outlet (54) directly connected to the stripped water outlet (48), and a lower end (56) spaced above the bottom of the tank (40, 41, 42) to allow the inflow of groundwater. An air diffuser (58) is secured in the lower end (56) of each concentrator tube (50) to provide a supply of air which comes in intimate contact with only the groundwater within the interior of the concentrator tube (50). The concentrator tubes (50) in each of the stripper tanks (40, 41, 42) are essentially identical except that the intermediate outlet (54) is positioned at successively lower elevations to correspond to the elevation of the stripped water outlet (48) for each tank (40, 41, 42).

As shown in FIG. 2, the main electrical service (70) provides for a light (72) and heater (74) which may be located inside the trailer (12) for use in freezing weather. Also, timers (76 and 78) are provided to control the intermittent operation of the pump (20) and the air compressor (70).

Estimating Bubbler-type Air Stripper Performance Theoretics

Bubbler-type stripping is useful in removing VOC's from large volumes of water under low flow conditions (<15 gpm). To design a stripper to fit the needs of any given concentration, Henry's Law Constant (H) (Henry's Coefficient) is a useful estimator of stripping efficiency. Henry's Coefficient is described below as:

$$H = \frac{VOC \text{ concentration in air } [\mu g/l]}{VOC \text{ concentration in water } [\mu g/l]}$$

Ease of stripping has been shown not to be a function of dissolved concentration, aeration performance is independent of concentration. By expressing H as dimensionless, the reciprocal:

1/H (called the partition coefficient) is the theoretical air to water ratio for removing a VOC by air stripping. Aeration needs can be simplistically estimated knowing Henry's Coefficient. Trichlorethylene (TCE) as an example, has:

H = 0.48 @ 20° C.
1/H = 2.1 therefore
2.1 volumes of air are needed for every
volume of VOC contaminated water.

In practice, though, it has been found that the actual air-to-water ratio averages approximately 20 times the theoretical value for bubbler-type aeration. The actual volume:volume ratio for the example above will then be:

(1/H)20 = (2.1)20 = 42 volumes air/volume water

It is then easy to calculate residency time (flow rates) based on fixed volumes of supplied diffused air. Table 1 gives H for some common underground storage tank VOC's associated with gasoline and other petroleum products.

TABLE 1

| Henry's Coefficients and Stripping Volumes | | | |
|---|---|---|---|
| Compound | H | 1/H | Actual |
| BENZENE | 0.21 | 4.76 | 95.2 |
| TOLUENE | 0.33 | 3.03 | 60.6 |
| ETHYLBENZENE | 0.37 | 2.70 | 54.0 |
| XYLENE | 0.43 | 2.33 | 46.6 |
| TRICHLORETHYLENE | 0.48 | 2.08 | 41.6 |
| TETRACHLOROETHYLENE | 0.99 | 1.01 | 20.2 |
| VINYL CHLORIDE | 178.85 | 0.006 | 0.1 |

Design

Research of the available fabrication materials to construct bubbler-type strippers revealed only three suitable materials to address a broad range of contaminants without degradation of the fabrication materials: Corning tempered glass, stainless steel, or polyvinyl chloride plastic. Corning tempered glass, while having excellent resistance to reaction and degradation, is severely brittle and extremely expensive for fabrication and materials costs. Stainless steel has excellent resistance to most chemical attack and is very durable; however, costs for materials and fabrication are still too high. Polyvinyl chloride appears to have relatively good resistance to a broad range of chemical substance attack, is very durable, and due to its low materials cost and ease of fabrication, appears to be the best choice for construction.

EXAMPLE 1

A 12" inside-diameter PVC pipe 90" tall with an effective water level of 72" holds approximately 6780 cubic inches of water with a thin-walled concentration tube inserted into the water. This equates to approximately 4 cubic feet or 29.4 gallons. If the thin-walled concentration tube is 4" inside diameter and has an effective column of approximately 66 inches, then the volume inside the tube is approximately 0.48 cubic feet. By calculation from the Table 1, this amount of benzene contaminated water would require approximately 45.7 cubic feet of air.

Assuming an air flow rate through the air diffuser of 2.5 scfm then the maximum residence time flow rate to 99% benzene removal is approximately 1.3 cu.ft./hr. Increasing air flow rate decreases residency time and increases water throughput. Increasing air flow rate to 10 scfm increases throughput to 5.25 cu.ft./hr.

Alternative to increasing air flow rate from 2.5 scfm, an additional bubbler unit may be added to reduce residency time by approximately 70% (2.2 cfh) from that of only one unit, and a third unit may be added to reduce residency time by an additional 70% (3.8 cfh) from that of the two units combined. At 10 scfm air flow rate, the addition of one more bubbler unit increases throughput to approximately 8.93 chf, and a third unit increases throughput to about 15.2 cfh.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A diffused air volatile organic compound stripping system, comprising:

a stripping tank disposed to receive a flow of ground water containing volatile organic compounds, the stripping tank including a water inlet, an air inlet, a stripped water outlet, and a vapor outlet;

pump means for supplying ground water to the stripping tank through the water inlet;

a concentrator tube disposed within the stripping tank, the concentrator tube having an upper end disposed in direct fluid communication with the vapor outlet, an intermediate outlet disposed in direct fluid communication with the stripped water outlet, and a lower end disposed to receive the flow of ground water; and an air diffuser secured within the lower end of the concentrator tube and being operably connected through the air inlet to an air supply, whereby air supplied through the diffuser contacts the ground water flowing within the concentrator tube, strips volatile organic compounds from the ground water, and carries stripped vapors of organic compounds out through the vapor outlet while stripped ground water flows through the intermediate outlet to exit the stripping tank through the stripped water outlet.

2. The system of claim 1 wherein the concentrator tube further includes a vent opening disposed above the intermediate outlet.

3. The system of claim 1 wherein the entire system is assembled within a portable trailer.

4. The system of claim 1 further including a plurality of stripping tanks step-phase connected in series to allow gravity feed of ground water through the system.

5. The system of claim 1 further including a separator tank disposed between and in fluid communication with the pump means and the stripping tank, the separation tank including an inlet for receiving the flow of ground water, a water outlet, and a free product outlet disposed above the water outlet, wherein ground water flowing into the separation tank separates into a lighter free product fraction that flows out through the free product outlet and a heavier ground water fraction that flows out through the water outlet to the stripping tank.

6. The system of claim 5 further including a free product drum disposed in fluid communication with the separation tank to receive the flow of free product, the free product drum including an overflow shut-off switch operably connected to the pump means.

* * * * *